United States Patent
Byrne et al.

(10) Patent No.: US 7,356,847 B2
(45) Date of Patent: *Apr. 8, 2008

(54) SYSTEM FOR DYNAMICALLY ENCRYPTING CONTENT FOR SECURE INTERNET COMMERCE AND PROVIDING EMBEDDED FULFILLMENT SOFTWARE

(75) Inventors: Shannon Byrne, Whistier (CA); Innes Muecke, Halifax (CA); Andrew Patterson, Dartmouth (CA); David Slik, Brackendale (CA)

(73) Assignee: Protexis, Inc., Vancouver, BC (CA)

( * ) Notice: Subject to any disclaimer, the term of this patent is extended or adjusted under 35 U.S.C. 154(b) by 453 days.

This patent is subject to a terminal disclaimer.

(21) Appl. No.: 10/126,973

(22) Filed: Apr. 22, 2002

(65) Prior Publication Data

US 2003/0208680 A1 Nov. 6, 2003

Related U.S. Application Data

(63) Continuation-in-part of application No. 10/126,974, filed on Apr. 22, 2002, now Pat. No. 7,010,697, which is a continuation of application No. 09/031,536, filed on Feb. 27, 1998, now abandoned, which is a continuation-in-part of application No. 08/670,846, filed on Jun. 28, 1996, now Pat. No. 5,809,145.

(51) Int. Cl.
*H04L 9/30* (2006.01)
(52) U.S. Cl. .................. 726/28; 726/30; 713/153; 705/51; 380/282
(58) Field of Classification Search ............. 380/231, 380/282, 281; 705/51, 52, 53, 56, 57; 713/153, 713/163; 726/26, 31, 30, 28
See application file for complete search history.

(56) References Cited

U.S. PATENT DOCUMENTS

| 5,222,134 | A | | 6/1993 | Waite et al. ............... 705/59 |
|---|---|---|---|---|
| 5,247,575 | A | | 9/1993 | Sprague ...................... 380/9 |
| 5,297,206 | A | | 3/1994 | Orton .......................... 380/30 |
| 4,646,234 | A | * | 2/1987 | Tolman et al. ............. 713/200 |
| 4,713,753 | A | | 12/1987 | Boebert et al. ............. 364/200 |
| 4,736,423 | A | | 4/1988 | Matyas ........................ 380/23 |
| 4,888,798 | A | | 12/1989 | Earnest ......................... 380/4 |
| 4,897,874 | A | | 1/1990 | Lidinsky et al. ............. 380/25 |
| 4,926,476 | A | | 5/1990 | Covey ........................... 380/4 |
| 5,010,571 | A | | 4/1991 | Katznelson ................... 380/4 |
| 5,014,234 | A | * | 5/1991 | Edwards, Jr. .............. 713/200 |
| 5,058,162 | A | | 10/1991 | Santon ......................... 380/25 |
| 5,218,638 | A | | 6/1993 | Matsumoto et al. ......... 380/23 |

(Continued)

FOREIGN PATENT DOCUMENTS

WO WO020508 10/1993

(Continued)

*Primary Examiner*—Emmanuel L. Moise
*Assistant Examiner*—Paul Callahan
(74) *Attorney, Agent, or Firm*—Roylance, Abrams, Berdo & Goodman, L.L.P.

(57) ABSTRACT

A data distribution system is provided which supplies customers with an executable for requested secured data files to provide the customer with fulfillment software, obviating the need for the customer to download fulfillment software prior to requesting secure data. The data distribution system is characterized by server technology which can dynamically encrypt secured data files just prior to a customer request to download the data file. A framework for building a universal data distribution infrastructure is provided which employs Requesters.

18 Claims, 6 Drawing Sheets

U.S. PATENT DOCUMENTS

| | | | |
|---|---|---|---|
| 5,319,705 A | 6/1994 | Halter et al. | 380/4 |
| 5,337,357 A | 8/1994 | Chou et al. | 380/4 |
| 5,341,429 A | 8/1994 | Stringer et al. | 705/52 |
| 5,369,702 A | 11/1994 | Shanton | 380/4 |
| 5,386,369 A | 1/1995 | Christiano | 364/464 |
| 5,400,403 A | 3/1995 | Fahn et al. | 380/21 |
| 5,410,598 A | 4/1995 | Shear | 380/4 |
| 5,414,772 A | 5/1995 | Naccache et al. | 380/46 |
| 5,457,746 A | 10/1995 | Dolphin | 380/4 |
| 5,499,295 A | 3/1996 | Cooper | 380/23 |
| 5,504,814 A | 4/1996 | Miyahara | 380/4 |
| 5,509,070 A | 4/1996 | Schull | 380/4 |
| 5,511,122 A | 4/1996 | Atkinson | 380/25 |
| 5,557,796 A | 9/1996 | Fehskens et al. | 395/650 |
| 5,615,264 A | 3/1997 | Kazmierczak et al. | 380/4 |
| 5,634,012 A | 5/1997 | Stefik et al. | 395/239 |
| 5,646,992 A | 7/1997 | Sabler | 380/4 |
| 5,708,709 A | 1/1998 | Rose | 705/59 |
| 5,907,617 A | 5/1999 | Ronning | 705/52 |
| 5,918,213 A | 6/1999 | Bernard et al. | 705/26 |
| 5,956,709 A | 9/1999 | Xue | 707/3 |
| 6,044,469 A | 3/2000 | Horstmann | |
| 6,243,692 B1 | 6/2001 | Floyd et al. | |
| 6,334,214 B1 | 12/2001 | Horstmann | |
| 6,363,356 B1 | 3/2002 | Horstmann | |
| 6,434,532 B2 | 8/2002 | Goldband et al. | |
| 6,898,555 B2 | 5/2005 | Levi et al. | |
| 6,915,425 B2 | 7/2005 | Xu et al. | |
| 7,047,369 B1 | 5/2006 | Gruper et al. | |
| 7,065,650 B2 | 6/2006 | Collins et al. | |

FOREIGN PATENT DOCUMENTS

WO      WO021162      6/1997

* cited by examiner

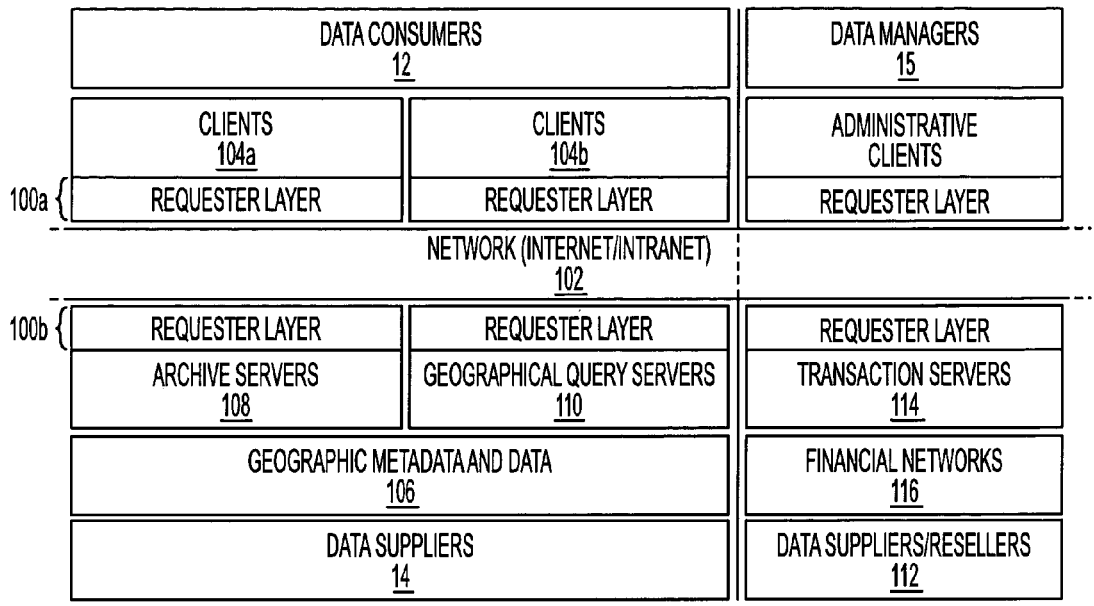
FIG. 10
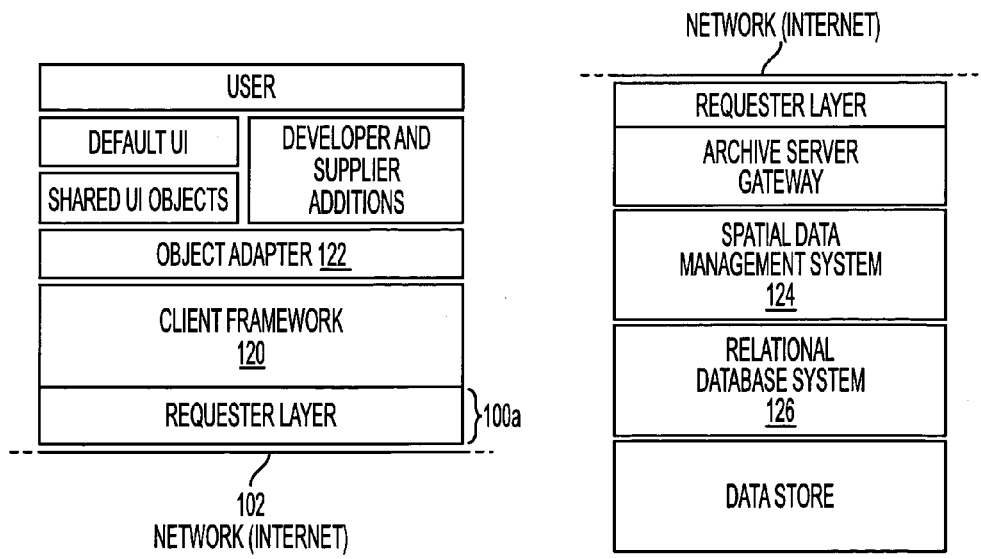
FIG. 11
FIG. 12

SYSTEM FOR DYNAMICALLY ENCRYPTING CONTENT FOR SECURE INTERNET COMMERCE AND PROVIDING EMBEDDED FULFILLMENT SOFTWARE

This application is a continuation-in-part of U.S. patent application Ser. No. 10/126,974 of Byrne et al, filed Apr. 22, 2002 and entitled "System For Dynamically Encrypting Information For Secure Internet Commerce And Providing Embedded Fulfillment Software", now issued as U.S. Pat. No. 7,010,697, which is a continuation of U.S. patent application Ser. No. 09/031,536, filed Feb. 27, 1998 (abandoned), which is a continuation-in-part of U.S. patent application Ser. No. 08/670,846, filed Jun. 28, 1996, now issued as U.S. Pat. No. 5,809,145, the entire subject of which are hereby incorporated herein by reference for all purposes.

FIELD OF INVENTION

The invention relates to a system for allowing information providers to prepare digital information for secure electronic commerce via the internet, including dynamic encryption of the information, and for allowing customers to browse and purchase secured, purchasable data or simply to unlock secured correspondence that is intended for a some customers and not others without having to pre-load fulfillment software.

BACKGROUND OF THE INVENTION

Demand for network-based distribution of protected and unprotected data is increasing dramatically. Yet, many challenges exist that need to be addressed to effectively distribute data via electronic commerce such as: (1) conducting reliable, secure transactions necessary to build confidence with both information providers (e.g., data publishers) and data customers; (2) ensuring that data can be located, accessed and purchased in a timely manner; and (3) ensuring that information providers or publishers can specify access controls and that the administration of the posting of datasets which are capable of changing dynamically is not unwieldy and unmanageable.

A need exists for a data distribution infrastructure which addresses the aforementioned challenges and which overcomes a number of disadvantages associated with existing distributed data commerce systems. Traditional distributed data commerce systems are implemented behind a firewall so that secure transactions can be made. These systems, however, are characterized by high installation and maintenance costs for both software and hardware. Another disadvantage associated with many existing distributed data commerce systems is the requirement of a customer to load special fulfillment software onto the customer computer prior to the acquisition of any secure data. The fulfillment software enables the customer to order, purchase and decrypt secure data. Another disadvantage of many existing distributed data commerce systems arises from the static encryption of datasets. Information providers typically encrypt datasets to be distributed as secure datasets and store the secured datasets on a web server prior to any demand for the datasets by customers. Thus, modification of the datasets and overall administration of the posting of the datasets is less efficient since the data is already encrypted.

SUMMARY OF THE INVENTION

In accordance with an aspect of the present invention, a data distribution system is provided which transmits secured information, which is to be sold as a purchasable item or sent as secure correspondence, to a customer with an embedded executable. The embedded executable facilitates the acquisition of release codes or keys to decrypt the secured information, while obviating the need to load fulfillment software on the customer computer prior to requests for or receipt of secured information.

In accordance with another aspect of the present invention, server technology is provided to permit an information provider to dynamically encrypt information that is to be transmitted to a customer for purchase or as secure correspondence. The server technology encrypts data to be secured and which has been selected by a customer just prior to transmitting the data to the customer. In other words, encryption at the information provider's website is performed on-the-fly. Accordingly, individual pieces of content are provided in a secure commerce container.

BRIEF DESCRIPTION OF THE DRAWINGS

These and other features and advantages of the present invention will be more readily comprehended from the following detailed description when read in connection with the appended drawings, which form a part of this original disclosure, and wherein:

FIGS. 10, 11 and 12 are schematic block diagrams illustrating software modules including Requesters in a distributed framework for building universal data distribution infrastructures in accordance with an embodiment of the present invention.

DETAILED DESCRIPTION OF THE PREFERRED EMBODIMENTS OVERVIEW

Figure 1:
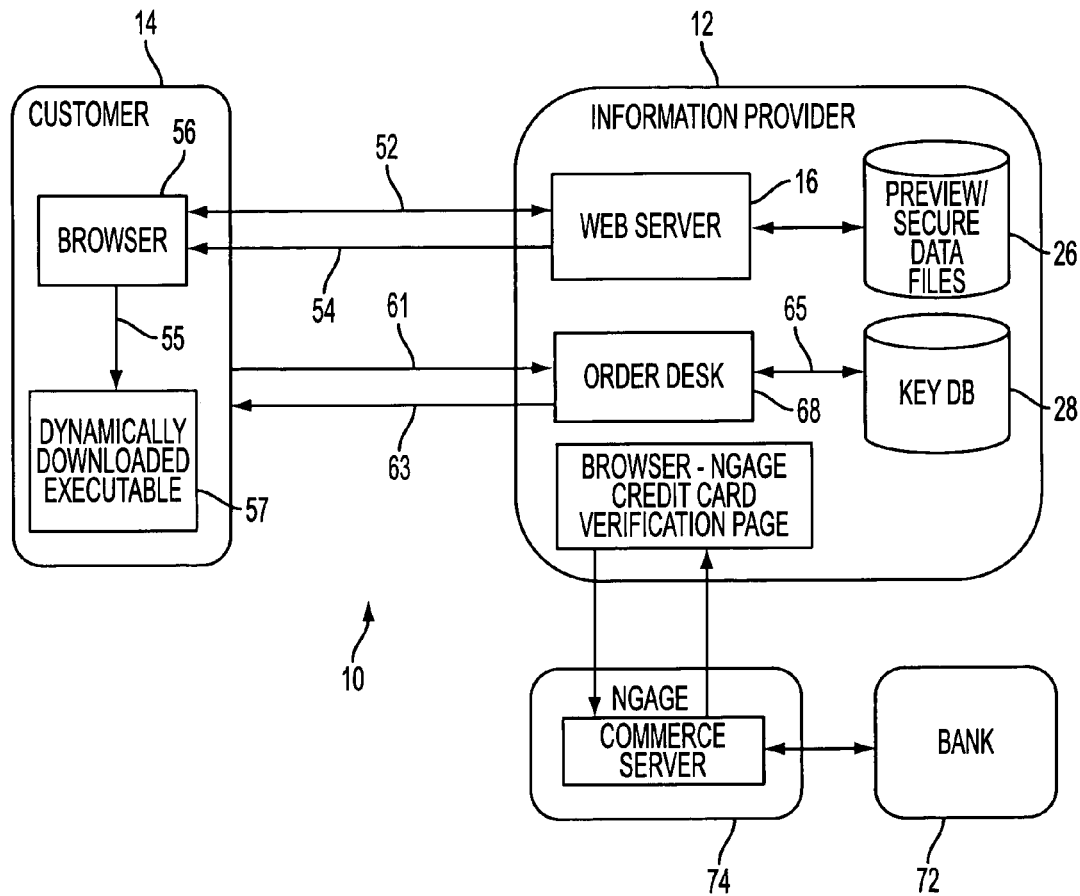
FIG. 1 is a schematic block diagram of a data distribution system illustrating the dynamic downloading of an executable with secure data files to provide customers with fulfillment software in accordance with an embodiment of the present invention.

A data distribution system (DDS) 10 is provided in accordance with the present invention to allow information providers (IPs) to prepare digital information hereinafter referred to as "content") for commerce, as well as to perform data retrieval and transmission, and transactional services. A number of embodiments are described below which provide different electronic commerce functions. For example, a desktop encryption/decryption system (DES) is described in connection with FIGS. 1-8 which permits seamless integration of secured data commerce functionality with existing software applications and operating systems without requiring modification to a user's system. An information provider (IP) 12, as shown in FIG. 1, can use the DES to make digital content into a purchasable item, or simply to encrypt the content for a secured correspondence transmission that does not require purchasing thereof A customer 14 can receive the secured correspondence or purchasable item via the internet or download these items from a compact disc (CD), for example. The DES provides the secured correspondence or purchasable item with an embedded executable to provide preview and purchase functions to the customer without having to modify software applications and operating system (OS) on the customer computer prior to receiving the secured content.

Figure 9:
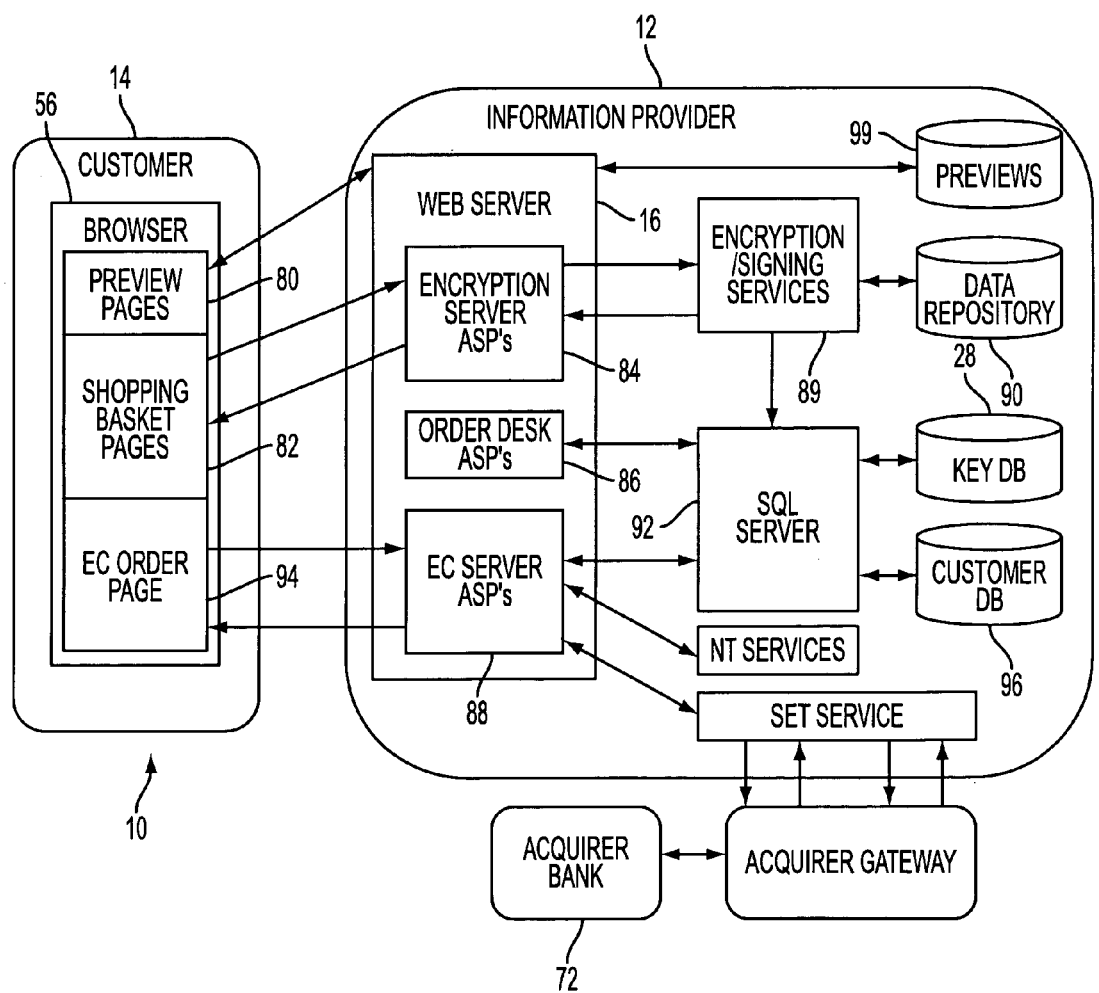
FIG. 9 is a schematic block diagram of a data distribution system which dynamically encrypts secure content in accordance with an embodiment of the present invention.

In addition, server-based technology is provided which permits dynamic encryption of content and which permits customers and IPs to otherwise engage in internet commerce (i.e., to request, preview, download and purchase selected secured content), as will be described below in connection with FIG. 9. Finally, a distributed framework is provided which can be adopted by IPs as a standardized framework from which to build a universal data distribution infrastructure, as shown in FIGS. 10-12. The distributed framework preferably employs the kernel and Requester technology that is the subject of U.S. Pat. No. 5,809,145, the entire subject of which is hereby incorporated herein by reference for all purposes.

Desktop Encryption/Decryption System (DES)

Figure 2:
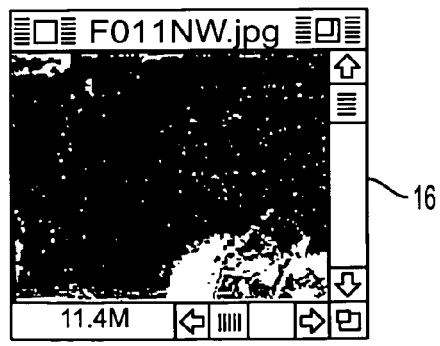
FIGS. 2 and 3 depict exemplary computer screens generated on an information provider's computer to allow an information provider to create purchasable content in accordance with an embodiment of the present invention.
Figure 3:
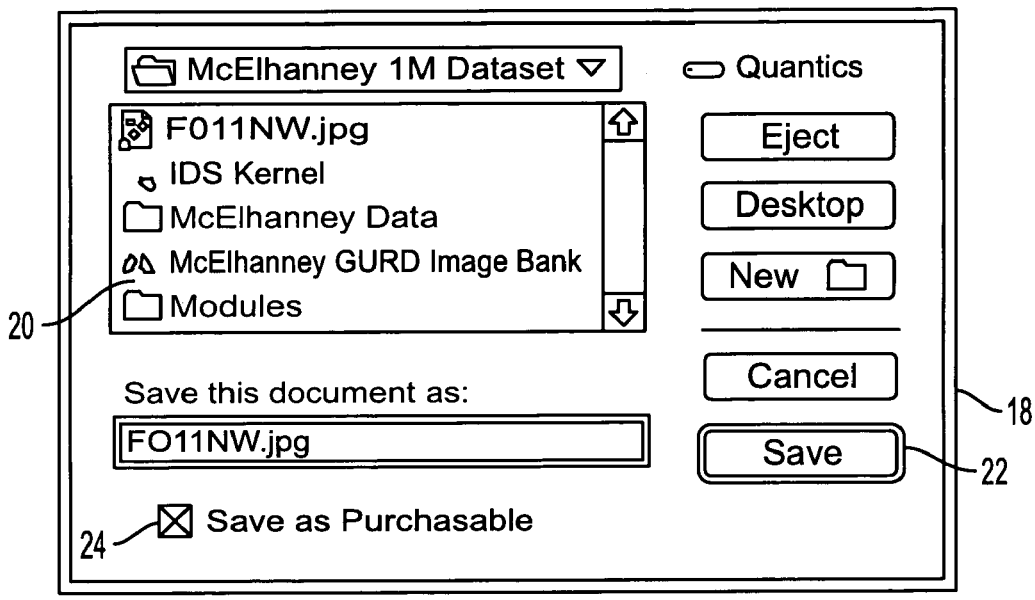
Figure 5:
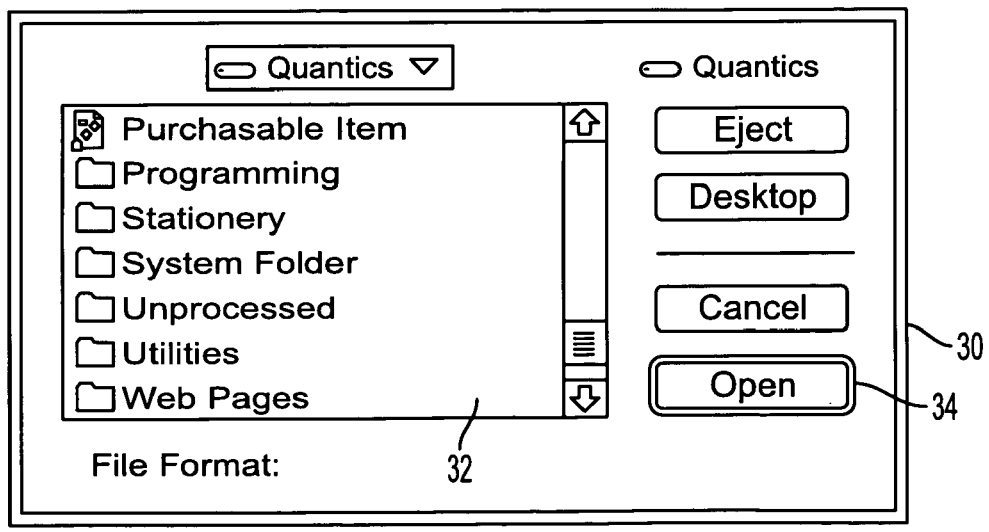
FIGS. 5, 6 and 7 are exemplary computer screens generated on a customer computer for selecting a purchasable item and purchasing a release code to decrypt the purchasable item in accordance with an embodiment of the present invention.

The DES provides an IP 12 with means to create secured content in the form of purchasable items or secured correspondence. The DES preferably comprises software operating on a IP computer (e.g., a Web Server 16) which generates screens 16 and 18, as depicted in FIGS. 2 and 3, respectively, when the IP is preparing content for secure commerce or transmission. The IP 12 can create content via an input device and an application program (e.g., word processing, image processing or publishing software) or retrieve existing content stored in a memory device. The newly created or retrieved files are listed in the dialogue box 20 in the "Save as Purchasable" screen 18. In accordance with the present invention, the DES software translates a user input such as selection of the "Save" button 22 into a DES function. For example, when the "Save as Purchasable" option 24 is selected by the IP 12, the "Save" call resulting from activating the "Save" button is flagged by the DES to create a purchasable item. The DES subsequently invokes special handlers in accordance with the present invention to prepare, secure (e.g., encrypt) and package the saved content for distribution via sale, or simply secure correspondence transmission with no sale.

In addition to using a secure wrapper for encryption, the DES provides the encrypted content with an embedded executable in accordance with the present invention. The executable translates application-wide and OS-wide calls such as "file open", "read", "write" and "close" into DES events such as saving selected data as a purchasable item, or providing customers with preview and purchasing dialogue, in the OS and one or more of the applications being run on the IP 12 computer or customer 14 computer. Thus, the fulfillment software required to preview, request a release code, purchase a release code and to decrypt selected content via the release code is provided to a customer computer following transmission of the selected secure content. The DES is therefore advantageous because a customer need not have previously installed fulfillment software prior to the request or receipt of the selected secure content.

With regard to an IP, the DES stores content saved as purchasable content on a hard drive 26 or other memory device as a protected file. The encryption can be, for example, in accordance with an encryption method that generates machine-dependent release codes such as the method described in U.S. Pat. No. 5,809,145 incorporated by reference herein. Other encryption algorithms, however, can be used. The special handlers of the DES assign a product code for the protected file containing the purchasable item and create a release code or key to decrypt or unlock the protected file. By way of an example, raw and unencrypted data in a digital format is stored in independent data files at, for example, an IP data processing facility. The key for encrypting and decrypting the data can be generated, for example, cryptographically using a random number generator. The encrypted data is then stored in a database at a particular location. A unique dataset code is assigned to the dataset and is preferably generated using a hash algorithm on the location of the dataset. The location of the dataset, the key and the hashed dataset code are then stored in a key management database maintained at the IP or separate fulfillment center. The encrypted data is distributed via CD-ROM, for example, or made available via a network (e.g., the internet).

A user can select a dataset and initiate a request by clicking on an item in a preview screen, for example. A hardware-dependent digital signature (HDDS) is generated in response to the dataset request. The signature can be based on a card number of a board within the customer computer or other computer-specific device. The location of the selected dataset is determined by the computer using a table on the CD-ROM or available via a network and preferably hashed. The hashed location is then concatenated with the HDDS and compressed to present the user with a product code corresponding to the selected dataset.

The product code is forwarded to the IP or fulfillment center, where it is processed to decompress the product code, and to extract the hashed location of the selected dataset and the HDDS. The hashed location is used to find the key within the key management database for decrypting the requested dataset The HDDS is then hashed and encrypted along with the key. The encrypted key is concatenated with the hashed dataset code, compressed, and sent as a release code to the customer.

With reference to FIG. 3, the IP 12 can store the release codes in a key database 28. In the DES, a customer 14 can obtain a release code for a selected purchasable item or for secure correspondence directed to the customer via a telephone order or a facsimile modem or transaction in accordance with one embodiment of the present invention. The DES preferably provides a two layer approach to providing protected content for commerce. First, encrypted files are browsed and downloaded by the customer 14. Second, the customer 14 subsequently initiates a transaction to unlock selected ones of the encrypted file(s). Thus, the content to be protected in the present example is statically encrypted, that is, it is encrypted and stored at an IP 12 or provided on a physically distributed memory medium such as a CD even before a customer 14 has decided to unlock and, if necessary, download or purchase the content. A method of dynamically encrypting the content in accordance with another aspect of the present invention is described in connection with FIG. 9.

Figure 4:
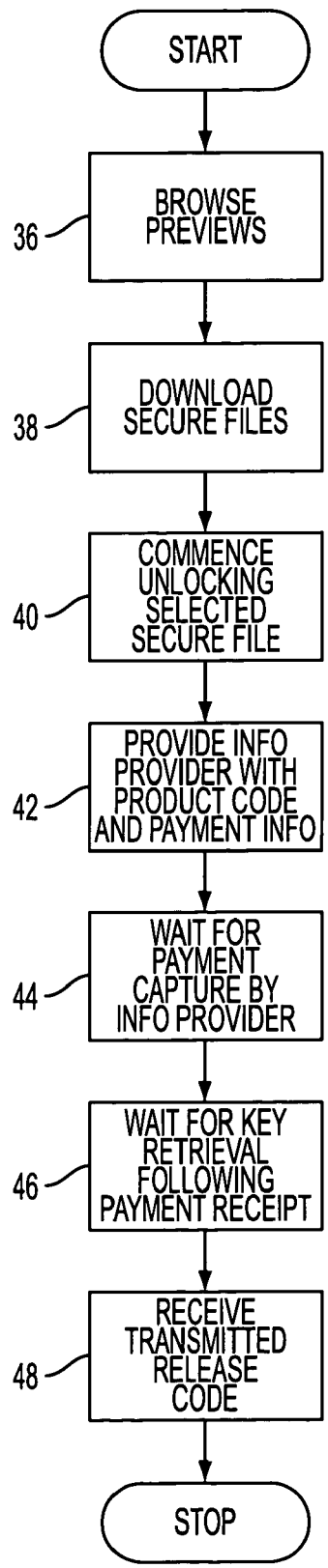
FIG. 4 is a flow chart depicting the sequence of operations for requesting a secured file with an embedded executable in accordance with an embodiment of the present invention.
Figure 6:
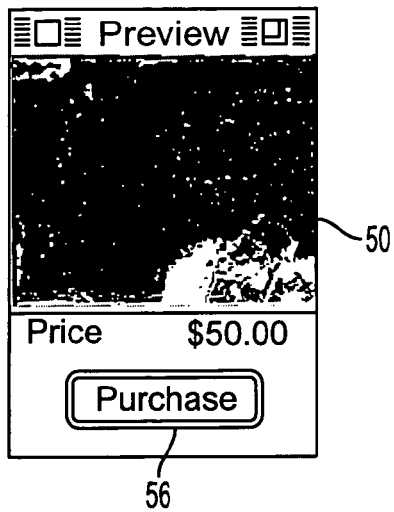

The purchase transaction supported by the DES is illustrated in FIG. 4. With reference to block 36 in FIG. 4, the customer 14 computer lists files retrievable from a CD in a CD drive connected thereto, or from a local hard drive, or from a remote website database 26 via an internet browser. The customer 14 computer generates a screen 30 (FIG. 5) which lists files that can be "opened" in a dialogue box 32 in a conventional manner using application software and/or the OS. If selected from the box 32, the embedded executable of a purchasable item preferably interprets the selection of the "open" button 34 as a request for a preview display screen 50, as shown in FIG. 6, which is optionally provided by the executable when the purchasable item is encrypted.

Figure 7:
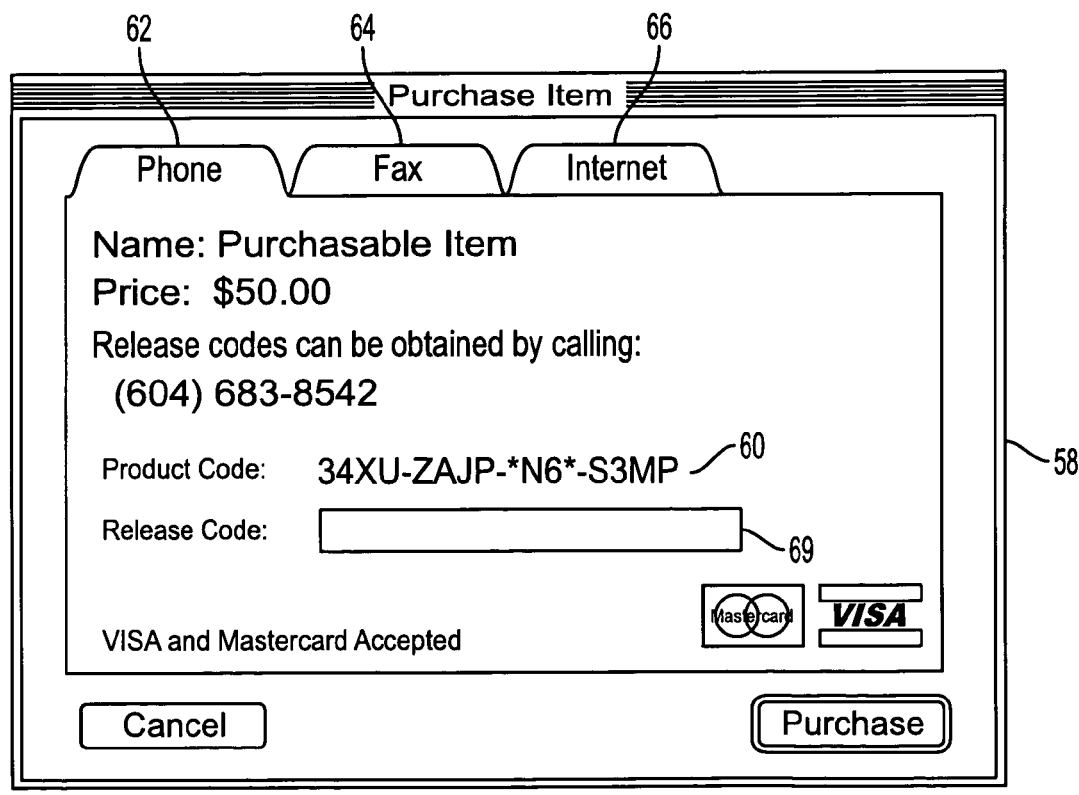
Figure 8:
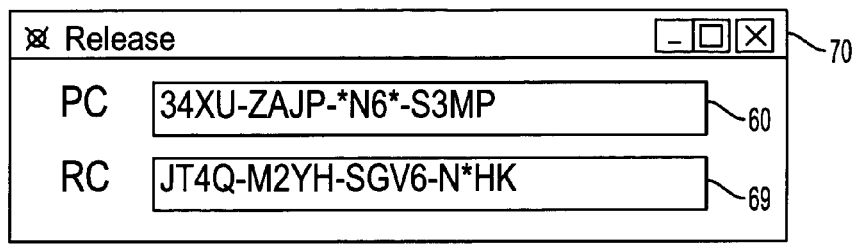
FIG. 8 depicts an exemplary computer screen generated on an information provider's computer to locate a release code corresponding to a product code for a requested purchasable item in accordance with an embodiment of the present invention.

As indicated by the communication paths 52 and 54 illustrated in FIG. 1, the customer browses secure content and downloads the same into a local memory device (blocks 36 and 38 of FIG. 4). The downloaded files are each preferably provided with an embedded executable in accordance with the present invention. When a customer 14 selects the "open" button 34 (FIG. 5), or selects a "Purchase" button 56 on the "Preview" screen 50 in the currently-executing software application, and the file to be opened is identified as being purchasable, special handlers in the embedded executable annunciate user interface elements and initialize operations to be performed on the read and write functions. For example, a "Purchase Item" screen 58, as indicated in FIG. 7, is generated by the executable on the customer computer.

With continued reference to FIGS. 1 and 4, the executable provided with the downloaded secure content provides means for the customer computer to commence unlocking or decrypting the secure content in accordance with the present invention. The executable is represented by the reference numeral 57 for illustrative purposes. In accordance with the present invention, the executable 57 is not made available to the customer 14 computer until after downloading, as represented by the data path 54.

As illustrated by the data path 55 in FIG. 1 and the block 40 in FIG. 4, the executable 57 now commences decrypting of the secured content. As shown in FIG. 7, the customer 14 has the options 62, 64 and 66, respectively, of contacting the fulfillment center to purchase the selected content via a telephone transaction with an operator at a fulfillment center order desk 68 (FIG. 1), of transmitting a facsimile purchase order using a modem, or conducting an internet commerce transaction (e.g., as described below in connection with FIG. 9. The dialogue box in FIG. 7 provides a product code 60 for identifying the selected secured content to a fulfillment center, as indicated by the data path 61 in FIG. 1. The product code can be spoken to an operator at the order desk 68 during a telephone transaction, or transmitted via a facsimile modem or via the internet. The customer provides additional data such as a credit card information for payment and customer name (block 42 of FIG. 4).

With reference to blocks 44, 46 and 48 in FIG. 4, an order desk operator can enter the product code 60 on an IP computer. A release code screen 70 (FIG. 8) can be generated for display on the order desk computer to indicate the release code once a release code has been located in the key database 28 which corresponds to the product code. Upon verification of valid credit card payment with a bank 72 via a commerce server 74, the order desk computer retrieves the release code 69, as indicated at 65, and provides the release code to the customer, as indicated at 63. The customer computer can then use the release code corresponding to the product code to unlock the protected file so that the purchased content is ready for use. It is to be understood that release codes, as well as product codes, can be transmitted between the customer 14 and the IP 12 verbally via a telephone call, or by transmission via the internet or facsimile Server-Based Technology For Commerce-Enabling a Website In accordance with another aspect of the present invention, the DDS 10 uses server-based technology to implement internet commerce at an IP website. As shown in FIG. 9, a customer 14 uses an internet browser 56 to access an IP website via a Web server 16. The IP allows the customer to initiate queries on the server data repository and search for content. The customer then selects content that is of interest. The IP can bundle various mixed digital media content (e.g., images, audio, video, software) into a customized package. The portions of the package are encrypted with a unique cryptographic key(s). A unique package identifier (or "serial number") is created and stored in a transaction database, along with the unique cryptographic key(s). Alternatively, the identifiers and keys may be generated prior the to packaging process, as long as they have not been used by another package. The package may contain previews of digital content and/or trial versions of software applications that are not encrypted. As described above, a software application (e.g., an embedded executable) that manages the package is added to the package contents and is configured so that the customer can execute the application on their computer after they have downloaded the package. The management application allows the user to access any preview and trial content, and handles the enablement process. As stated above, the present invention is advantageous because no pre installed fulfillment software is required on the customer's computer.

In accordance with the present invention, the web server 16 preferably comprises a number of application-specific programs (ASPs) for implementing an encryption server 84, ASPs for controlling an order desk 86, and ASPs 88 for electronic commerce (EC) server functions. The customer downloads the package as a single file or data stream. The customer can view any preview content included in the package. After review of secure content previews 79 using preview pages 80, the customer 14 can select purchasable items via Shopping Basket pages 82. When the customer initiates the fulfillment process, a product code is created that contains the unique package identifier (serial number), and a hardware identifier that is unique to the hardware of the customer's computer. The product code is sent to the fulfillment server. The product codes for the requested purchasable items are provided to the encryption server 84.

As stated previously, the encryption server retrieves the selected purchasable items from a data repository 90 wherein the data is not necessarily encrypted in any way. The retrieved purchasable items are encrypted on-the-fly by the encryption module 88 by preferably using machine-dependent release codes. The key is then stored in the database 28 via a SQL server 92. The requested, encrypted files are then provided to the server 16 for downloading to the customer 14. The customer may then go through a commerce transaction to purchase the package, or a component thereof After viewing the encrypted files via Shopping Basket pages, the customer can enter an EC order page 94. EC server ASPs are provided to obtain the corresponding key or release code from the key database 28 and any available customer data from a customer database 96 via the SQL server 92. The server locates the package identifier and keys in the database. The EC server ASPs 88 also perform transactional services such as a credit card transaction to pay for the requested, encrypted item. The server constructs a unique release code based on the information in the product code and the package keys, and sends it to the customer. Once payment is verified, the IP Website sends the release code to the customer to unlock the desired content. The customer enters the release code into the management application. The content is decrypted to the customer's computer. The customer may repeat the fulfillment process for another component in the package if more that one component exists.

Thus, the product code is generated on a customer's computer and contains a secured unique hardware identifier for that customer's computer. It is preferably not generated on the server when the product is encrypted and does not identify the product. A separate unique identifier is preferably used for that purpose. In addition, the release code is not generated on the server when the product is dynamically encrypted and sent to the customer, but rather it is generated on the server after the customer has downloaded the product and has sent the product code to the server. This may occur at a later time when they request the product to be enabled. The customer hardware identifier from the product code is required to generate the release code, thereby linking the release code to that particular customer's computer.

Universal Data Distribution Infrastructure

In accordance with the present invention and with reference to FIG. 10, a system for dissemination of data is provided which combines a number of disparate system components into a reliable, secure and scalable system to meet the needs of data consumers 12 and IPs 14. The system employs industry standard technologies, systems and development requirements, which generally behave as disparate systems, and Requesters, in accordance with the present invention to facilitate the inter-operation of a disparate systems to allow them to behave as a cohesive, single entity. Requesters are described in U.S. Pat. No. 5,809,145 which is incorporated by reference herein. Using object-oriented kernel programming, a requester architecture is provided to operate as a high speed communication routing system which permits the transfer of data between objects within systems and applications independently of the platform, software and operating system. Thus, the Requester architecture allows for rapid integration of existing technologies into a cohesive virtual network.

As shown in FIG. 10, the Requester layers 100*a* and 100*b* provide a standard way in which to perform high-level communications, bulk delivery and resource exploration, as well as to combine existing and future technologies in a seamless manner. The Requester technology, for example, can be integrated by being built on top of such industry standards as TCP/IP and CORBA.

The Requesters in the Requester layers 100*a* and 100*b* provide three services: messaging, bulk delivery and resource exploration. For messaging, a Requester allows different pieces of software to communicate with each other and can therefore be used extensively throughout an entire system for requests, posting of results and small data transfers. Requester messaging is similar to packet delivery in a network in that messages are routed from one object to others on the same computer or across the internet 102. Bulk delivery operations via Requesters are implemented on top of a messaging architecture to provide managed flows of data based on a connection-oriented mechanism. Requester bulk delivery is efficient because it allows dynamic link profiling, which uses minimum bandwidth while maximizing throughput, automatic bit width selection, failure recovery, compression and advanced flow control. Thus, downloading of large amounts of data is efficient and reliable for the user and easier for an IP since the data can be dumped into a stream or named pipe. Requester resource exploration enables the system to transform a collection of distinct elements into a single entity. Resource exploration permits software to explore what is available using lists, indices and directories, which are automatically generated and updated. Thus, Requester resource exploration significantly reduces maintenance, as well as facilitates the integration of advanced software agents that can dynamically probe large amounts of data in search of specific data entities.

In the exemplary system illustrated in FIG. 10, a framework is provided for distributing geographic data. It is to be understood that the framework can be used to distribute any type of data. The Requester layers 100*a* and 100*b* facilitate communication between data consumers 12, IPs 14 and data managers 15 via an internet or intranet 102. Individual consumers 12 and groups of consumers 104*a* and 104*b* can access data such as geographic metadata and other data 106 via servers such as an archive server 108 or geographical query server 110.

The relationships with consumers 12 is becoming more prevalent since profiles can be built on consumer data preferences as a consumer browses and accesses data. Profiles are an effective means for target marketing through advertisements and special offers. Preferred types of data, purchasing patterns and other information allow companies to identify who their customers are and therefore to more effectively sell their data or create relationships with re-sellers 112 to sell their data. Relationships between sellers and re-sellers for value-added data products based on many suppliers' data, percentages or fixed sums of transactions can be automatically routed by the framework illustrated in FIG. 10 to the correct parties, thereby facilitating supplier/re-seller relationships. The requester layer 100*b*, for example, facilitates the routing of financial and other data between transaction servers 114 and financial networks 116.

With reference to FIG. 11, client framework 120 can be implemented which standardizes ways in which users communicate with servers over the internet 102. Clients communicating through the Requester layer 100*a* to the different standards supported by the framework of the present invention can communicate with all vendor's servers without requiting specialized interface levels to obtain base functionality. Users can therefore point their internet browser to a data suppliers site which automatically loads a Java client link which links the user to the system. A client framework can also be developed to adapt new functionalities implemented on top of the client framework 120. Thus, developers can enhance the client framework to add specialized features and capabilities, to use alternate means of navigation and to embed new technologies. By allowing functions such as a pane to display a web page, data suppliers do not have to learn a completely new way of publishing content since they can place their web site as a metadata value on their archive server 108. For example, by exposing capabilities through an object adapter 122, an embedded Java applet or an ActiveX component can interact with the client to perform functions together to provide a unified user experience.

With reference to FIG. 12, server specifications define how servers communicate with each other and with clients through the Requester layers 100*a* and 100*b*. For example, specifications define how archive servers 108 advertise their presence, how data is labeled, as well as defining metadata requirements, data and metadata access methods, security options, access log formats, object announcement for resource exploration, and persistent wrapping for security in Requester interfaces. Archive server 108 specifications provide guidelines for storing data to be distributed, such as geographic data and metadata. In accordance with the present invention, an archive server specification is provided which sets forth basic functionality, required commands in the manner in which an archive server interacts with the Requester layer 100 and therefore provides information required for a vendor to develop a full-feature archive server based on existing server technologies. In the case of geographic data, many different geospatial data types exist Specialized archive servers can be created to manage different data types. For example, a spatial data management system 124 such as ESRI SDE can be developed for vector data which runs on top of a database environment 126 to provide fill capability vector data support Raster data has different requirements than vector data and requires a different approach. An archive server 108 can be implemented which supports such capabilities as arbitrary area extraction to better manage taster data.

Specifications are also provided for a query server 110 to provide guidelines for query systems for searching of data to be distributed. Query server specifications define basic functionality and commands that must be implemented, how the query server interacts with the requester layer 100, and advanced capabilities, such as automated index generation and resource detection. The specification can be used to create a layer on top of a current search engine to allow the search engine to become a seamless part of a cohesive system. Specifications for query servers can include how query servers advertise their presence, how indexed data can be accessed and discovered automatically, and can provide guidelines for searching data, as well as query initiated methods, list formats and requester interfaces.

Similarly, transaction server 114 specifications provide access control systems guidelines by defining basic functionality and commands that must be implemented, as well as defining how a transaction server interacts with a requester layer. Existing transaction servers are easily provided to a system with the addition of a layer such that interfaces with financial networks can be provided by financial transaction servers which is a subset of a transaction server specification. The system illustrated in FIG. 10 preferably uses the SET protocol developed by Visa and MasterCard. Transaction server specifications define how transaction servers advertise their presence, how transaction servers securely retrieve access control information from an archive server and how transaction servers invoke the wrapping of a piece of data and invoke requester interfaces.

While certain advantageous embodiments have been chosen to illustrate the invention, it will be understood by those skilled in the art that various changes and modifications can be made therein without departing from the scope of the invention as defined in the appended claims.

What is claimed is:

1. A method of delivering encrypted content to a user computer via a communication network comprising the steps of:

storing individual pieces of content in a server data repository, each of said individual pieces comprising at least one of an image, audio, video and software;

receiving queries from a user computer searching for content via a communication network to obtain selected content comprising at least two selections from the stored said individual pieces of content;

retrieving said selected content from said server data repository in response to said queries, said selected content comprising at least two of said individual pieces of content selected by the user;

encrypting at least a portion of said selected content using a key;

bundling the selected ones of said individual pieces of content in said selected content into a customized package;

generating and storing a unique package identifier for said package;

transmitting said package and said package identifier to said user computer for downloading;

receiving a request from said user computer to decrypt a selected portion of said package, said request comprising a machine-dependent product code generated at said user computer using said package identifier and a hardware identifier corresponding to at least part of said user computer to uniquely identify said user computer; and generating a release code for decrypting said selected portion using said key and said product code.

2. A method as claimed in claim 1, wherein said package comprises mixed digital media content having at least two of images, audio, video and software.

3. A method as claimed in claim 1, wherein said package comprises a management application to allow a user to access at least one of preview content and trial content in said package and to enable a transaction for acquiring selected content in said package.

4. A method as claimed in claim 1, wherein said generating and storing step comprises the step of storing said key and said package identifier in a transactional database, and said generating step comprises using said package identifier to locate said key in said transactional database.

5. A method as claimed in claim 1, wherein said package comprises at least one of previews of content and trial versions of software that are not encrypted.

6. A method as claimed in claim 1, further comprising the step of transmitting said release code to said user computer.

7. A method as claimed in claim 1, further comprising the steps of:

verifying payment for said selected portion; and transmitting said release code to said user computer.

8. A method as claimed in claim 1, wherein said hardware identifier is derived from a hardware device in said user computer.

9. A method as claimed in claim 1, wherein said hardware identifier is derived from a card number of a circuit board in said user computer.

10. A method as claimed in claim 1, wherein said content is stored unencrypted in said server data repository.

11. A method of delivering encrypted content to a user computer via a communication network comprising the steps of:

generating queries using said user computer to search for content via said communication network, said content being available from an information provider via a server and said communication network, said server storing individual items of content;

downloading a package from said information provider, said package comprising selected content items retrieved from said server data repository and bundled in response to said queries with a unique package identifier assigned to said package and stored in said server data repository, said selected content items comprising plural selections of said individual items of content stored in said server that were selected in response to said queries, at least a portion of said content items being encrypted using a key in response to said queries, said package having executable client fulfillment software attached thereto when created in response to said queries;

previewing said package using said user computer;

selecting at least one of said content items provided in said package;

generating a machine-dependent product code at said user computer, said product code comprising a unique identifier corresponding to said user computer and said package identifier; and transmitting a request for said at least one content item and said product code to said information provider.

12. A method as claimed in claim 11, wherein said at least one content item is encrypted and further comprising the steps of:

receiving a release code from said information provider to decrypt said at least one content item, said release code being generated using said product code and said key; and decrypting said purchasable item at said user computer using said release code.

13. A method as claimed in claim 11, wherein said package comprises secure content previews of selected said content items from said server data repository, said selected content items being stored unencrypted at said data repository, said reviewing step comprising the step of reviewing said previews, and further comprising the step of encrypting said at least one purchasable item in response to said request.

14. A method as claimed in claim 11, wherein said unique identifier is derived from a hardware device in said user computer.

15. A method as claimed in claim 11, wherein said unique identifier is derived from a card number of a circuit board in said user computer.

16. A method as claimed in claim 11, wherein said selected content items in said package comprise mixed digital media content having at least two of images, audio, video and software.

17. A method of delivering encrypted content to a user computer via a communication network comprising the steps of:

storing individual pieces of content in a server, each of said individual pieces comprising at least one of an image, audio, video and software;

receiving queries from a user computer searching for content via a communication network to obtain selected content comprising at least two selections from the stored said individual pieces of content;

retrieving said selected content from said server in response to said queries, said selected content comprising at least two of said individual pieces of content selected by the user;

encrypting each of the respective said individual pieces of content selected by the user with corresponding keys;

bundling the selected ones of said individual pieces of content in said selected content into a customized package, said package having executable client fulfillment software attached thereto when created in response to said queries;

generating and storing a unique package identifier for said package; and transmitting said package and said package identifier to said user computer for downloading.

18. A method as claimed in claim 17, further comprising the steps of:

receiving a request from said user computer to decrypt a selected portion of said package, said request comprising a product code generated using said package identifier and a hardware identifier that is unique to said user computer; and generating a release code for decrypting said selected portion using said key and said product code wherein the release code is not generated on the server when the respective one of said individual pieces corresponding to said selected portion was encrypted but after the user has downloaded the respective one of said individual pieces and generated said product code.

* * * * *